United States Patent [19]

Hawkins, II et al.

[11] Patent Number: 5,050,948
[45] Date of Patent: Sep. 24, 1991

[54] TRAVELING WAVE ELECTRO-OPTIC MODULATOR

[75] Inventors: Ralph T. Hawkins, II, Aloha; Jeffrey H. Goll, Lake Oswego; Steven H. Pepper, Portland, all of Oreg.

[73] Assignee: Tektronix, Inc., Beaverton, Oreg.

[21] Appl. No.: 571,057

[22] Filed: Aug. 23, 1990

[51] Int. Cl.⁵ .............................................. G02B 6/10
[52] U.S. Cl. ....................................................... 385/2
[58] Field of Search ..................................... 350/96.14

[56] References Cited

U.S. PATENT DOCUMENTS

| | | | |
|---|---|---|---|
| 4,776,656 | 10/1988 | Sanford et al. | 350/96.14 |
| 4,818,063 | 4/1989 | Takizawa | 350/96.14 |
| 4,842,367 | 6/1989 | Djupsjöbacka | 350/96.14 |
| 4,850,667 | 7/1989 | Djupsjöbacka | 350/96.14 |
| 4,880,288 | 11/1989 | Vatoux et al. | 350/96.14 |

*Primary Examiner*—William L. Sikes
*Assistant Examiner*—Robert E. Wise
*Attorney, Agent, or Firm*—John D. Winkelman; John Smith-Hill

[57] ABSTRACT

An electro-optic device comprises a substrate of electro-optic material having at least one optical waveguide formed therein subjacent a main surface thereof for propagating an optical mode. A coplanar transmission line is formed on the main surface of the substrate and has at least first and second electrodes spaced apart by an electrode gap that is wider than the first electrode. The center of the waveguide is within the electrode gap and closer to the first electrode than the second electrode.

9 Claims, 3 Drawing Sheets

TRAVELING WAVE ELECTRO-OPTIC MODULATOR

BACKGROUND OF THE INVENTION

This invention relates to a traveling wave electro-optic modulator.

It is well known that an electro-optic device may be fabricated using a substrate of electro-optic material by forming an optical waveguide in the substrate and depositing thin film electrodes on the surface of the substrate. When a potential difference is established between the electrodes, an electric field is created within the substrate and this influences the refractive index of the electro-optic material. Therefore, when light is propagated through the optical waveguide its phase and/or polarization vary in dependence upon the magnitude of the imposed electric field.

An electro-optic modulator may be used to carry out high speed sampling of an electrical signal with negligible perturbation of the signal. This is desirable in, for example, an oscilloscope or other test and measurement instrument. High speed sampling is applicable to signals containing very high frequency components. For a bandwidth beyond several GHz, electro-optic modulators are usually designed as traveling wave devices in which the electrodes on the substrate must constitute a transmission line.

The signal representing an event of interest is normally propagated from a device under test to a test and measurement instrument using a coaxial transmission line. The coaxial transmission lines that are most widely used for this purpose are of 50 ohm characteristic impedance. It is well understood that it is desirable that all transmission lines through which an electrical signal is propagated be of the same characteristic impedance. Therefore, it is desirable that the transmission line formed on the substrate of an electro-optic modulator designed for use as a traveling wave high speed sampler should be of 50 ohm characteristic impedance.

Conductive film deposited on a substrate of dielectric material allows several different configurations of planar transmission lines to be realized. For example, a slotline has two semi-infinite electrodes on one surface of the substrate, separated by a finite gap. A coplanar strip (CPS) transmission line comprises two electrodes of finite width on one surface of the substrate and spaced apart at a uniform distance. The coplanar waveguide (CPW) transmission line comprises two outer electrodes spaced apart on a surface of the substrate and a strip-form third electrode centered between the outer electrodes and on the same surface. The center electrode is of width S and the width of the gap between the center electrode and each outer electrode is W. The characteristic impedance of the CPW transmission line depends primarily on the effective dielectric constant of the substrate and on the values of S and W.

In general, a modulator with 50 ohm characteristic impedance requires a larger electrode gap W and thus a larger drive voltage on the device electrodes than a comparable modulator with lower impedance. To minimize the required drive voltage (and power) most modulators have been built with impedance substantially lower than 50 ohms. When such a modulator is used with a 50 ohm coaxial system, there are reflection losses and signal distortions attendant to the interface between the modulator and the system that must be minimized in the system implementation.

If a test and measurement instrument is connected to a traveling wave electro-optic modulator having planar film electrodes, an efficient transition must be provided between the planar transmission line of the modulator and the coaxial transmission line connecting the modulator to the test and measurement instrument in order to minimize reflection loss and signal distortion. The distortions generated in the interconnection between the planar transmission line and the coaxial transmission line may be associated with the mismatch in field patterns between the coaxial line and the planar transmission line. A CPW transmission line is a common choice for the electrode structure on a traveling wave modulator because fields produced by both the CPW line and the coaxial line have odd symmetry with respect to planes through the centers of the respective structures, and this partial match of symmetry allows a CPW to be coupled to a coaxial line with relatively low distortion.

In particular, amplitude modulators and switches that use the electric field component parallel to the surface of the modulator usually use a CPW transmission line with one optical waveguide in each gap. With this arrangement, the fields at the two waveguides are of opposite sign, and thus a push-pull effect is accomplished. Coplanar strip transmission lines are commonly used in amplitude modulators and switches that utilize the electric field component perpendicular to the surface of the modulator. In this case, the optical waveguides are usually located near or under the inside edges of the electrodes. With this arrangement, the relevant fields imposed on the two optical waveguides are again of opposite sign, accomplishing the desired push-pull effect. However, it may be more difficult to achieve acceptable distortions when connecting a coaxial line to a coplanar strip transmission line than to a CPW transmission line.

Of the electro-optic materials that are currently known, lithium niobate ($LiNbO_3$) is favored for commercial applications of the electro-optic effect because the process for manufacturing $LiNbO_3$ in a form suitable for use in electro-optic devices is well developed. In an electro-optic device based on $LiNbO_3$, it is desirable that the light propagation direction be in the XY plane, allowing use of the Z component $E_z$ of the electric field established between the electrodes of the device to interact with the optical field, because the electro-optic coefficient $r_{33}$ that characterizes the interaction between the component $E_z$ and light polarized in the Z direction is larger and less frequency dependent than the other electro-optic coefficients of $LiNbO_3$. (Other electro-optic materials, such as $LiTaO_3$, also have maximum electro-optic interaction for applied electric fields perpendicular to the direction of optical propagation.)

A crystal of $LiNbO_3$ may be cut perpendicular to its Z-axis in order to achieve a device in which light propagates in the XY plane and interacts with the field component $E_z$. In such a crystal, the field component $E_z$ is perpendicular to the main surface of the crystal, and this allows the two waveguide branches of a push-pull electro-optic modulator to be positioned in the same electrode gap. Accordingly, a Z-cut crystal permits use of a two-electrode CPS transmission line in a push-pull electro-optic modulator. It is also possible to use a three-electrode CPW transmission line in this case, although such an arrangement is not typically used. A crystal cut perpendicular to the X- or Y- axis also allows interaction with the field component $E_z$, but since the field component $E_z$ is parallel to the main surface of the crystal it is necessary that the two waveguide branches of a push-pull electro-optic modulator be in different respective electrode gaps. Accordingly, an X-cut or Y-cut crystal with a two-electrode transmission line does not allow push-pull operation and a CPW transmission line is generally used.

In an X-cut, Y-propagating device, workers have generally designed electro-optic modulators with the waveguides centered in the gaps. See, for example, D. Marcuse, "Optimal Electrode Design for Integrated Optics Modulators", *IEEE Journal of Quantum Electronics*, Vol. QE-18, No. 3, March 1982, 393–398, which describes an electro-optic modulator having a slotline on a substrate of electro-optic material and, in the context of a single waveguide in which the optical field interacts with the field component parallel to the main surface of the crystal, recommends that the waveguide be located centrally between the two closely spaced electrodes.

The electric field that must interact with the optical modes propagating in the waveguide branches of a push-pull electro-optic modulator in order to induce a 180° phase difference between the optical fields leaving the two waveguide branches determines the voltage $V_\pi$ that must be applied to the electrodes in order to induce such a phase difference. $V_\pi$ is a measure of the sensitivity of the modulator. It is usually desirable that $V_\pi$ be small. In general, it is possible to decrease $V_\pi$, and thereby improve sensitivity, by increasing the length L of the region over which the optical and electrical fields interact. However, the propagation velocity of an optical field in $LiNbO_3$ is different from the propagation velocity of an electric signal on a transmission line on $LiNbO_3$, and for a given interaction length L this velocity mismatch imposes a limit on the bandwidth of the signal that can be propagated by the CPW transmission line such that it will accurately modulate the power of the optical signal. Therefore, the greater the desired bandwidth, the smaller the interaction length L must be. Consequently, in order to achieve an efficient electro-optic modulator for high speed sampling, both $V_\pi$ and L must be minimized, and a standard measure of the sensitivity of such a modulator is $V_\pi.L$: a small value of $V_\pi.L$ indicates a desirable combination of high bandwidth and high sensitivity.

$LiNbO_3$ has a high relative dielectric constant (varying from about 30 to about 80 times that of air depending on the crystal and field orientations), which implies that in order to fabricate a 50 ohm CPW transmission line on a substrate of $LiNbO_3$ the width S of the center electrode must be much smaller than the width W of the gap between the center electrode and the outer electrodes. In practice, a lower limit is imposed on the value of S by the resistivity of the material from which the electrodes are formed, and consequently for a 50 ohm transmission line W must be many tens of micrometers. For example, for a center electrode width S of 30 μm, it can be shown on the basis of teachings in K. C. Gupta, "Microstrip Lines and Slotlines", Artech, 257 (1979) that W must be of the order of 100 μm. By way of comparison, a CPW transmission line having a characteristic impedance of about 25 ohm and a center electrode width S of 30 μm can be fabricated on a substrate of $LiNbO_3$ with W about 10–20 μm.

It is evident that for a given potential difference applied to the electrodes of an electro-optic modulator, as the gap width W increases, the field strength at a location in the gap decreases. The ideal parallel plate capacitor provides a simple model that might be used to give a crude estimate of the magnitude of the decrease in field strength with increasing W. In the parallel plate capacitor, the field is uniform in the dielectric medium, and scales inversely with the plate separation. The parallel plate capacitor model would thus predict that the field strength in the 50 ohm structure described above would be a factor of five to ten lower than the field strength in the 25 ohm structure described above. Consequently, the figure of merit $V_\pi.L$ would also be a factor of five to ten poorer in the 50 ohm structure if the parallel plate capacitor model were appropriate.

Since the electrodes of a coplanar transmission line do not constitute a parallel plate capacitor, more sophisticated models are required to calculate the field strength and $V_\pi.L$ in a traveling wave electro-optic modulator having a coplanar transmission line. Marcuse shows that in fact the magnitude of the electric field in the gap of a slotline does not scale inversely with the width of the gap. Field bunching at the edges of the electrodes results in some field enhancement near the electrodes. However, Marcuse indicates that the field enhancement is not sufficient to make a wide gap geometry practical.

FIG. 1A shows schematically a traveling wave electro-optic modulator 2 comprising a crystal 4 of $LiNbO_3$ and a slotline transmission line composed of electrodes 6. A single waveguide 8 is formed in the crystal with its center offset by a distance d from the edge of one electrode. The term "center", as used herein with reference to a waveguide (or branch), is intended to be understood as meaning the locus of points along the waveguide (or branch) at which the optical intensity in a plane perpendicular to the direction of propagation is a maximum. Curve A in FIG. 2 shows predicted values of $V_\pi.L$ as a function of gap width for the modulator shown in FIG. 1A for the case of an X-cut crystal and d equal to 3.0 μm. The function illustrated by curve A was calculated using Marcuse's model for the electric field.

FIG. 1B shows a modulator 12 similar to modulator 2 except that a CPW transmission line composed of ground electrodes 14 and a signal electrode 16 is used instead of a slotline. A comparison of FIGS. 1A and 1B suggests that it might be reasonable to assume that the field in one of the gaps of the CPW transmission line of FIG. 1B varies with position in the gap in the same manner as the field in the gap of the slotline of FIG. 1A. If this assumption is made, then $V_\pi.L$ for the modulator shown in FIG. 1B, with an X-cut crystal and d equal to 3.0 μm, should vary with gap width in accordance with curve A in FIG. 2. Therefore, based on Marcuse's results, we can estimate $V_\pi.L$ for a modulator using a CPW transmission line. For the case described previously, using a 30 micron wide center electrode, W is about 100 microns for a 50 ohm modulator and about 10 microns for a 25 ohm modulator. From curve A of FIG. 2, for optical waveguides centered 3.0 microns from the edges of the center electrode, we would predict that $V_\pi.L$ for the 50 ohm structure is approximately four times $V_\pi.L$ for the 25 ohm structure. By contrast, the parallel plate capacitor model suggests that $V_\pi.L$ is about ten times higher for the 50 ohm structure than for the 25 ohm structure.

The value of $V_\pi.L$ for a push-pull modulator similar to modulator 12 but having two waveguides offset by 3.0 μm from the edges of the center electrode of the CPW transmission line, which has a gap of 134 μm, was measured and found to be about 50 Vmm. The value of $V_\pi.L$ for the corresponding single waveguide modulator would be twice the value for the push-pull modulator, or about 100 Vmm, as shown by the cross (X) in FIG. 2. It can be seen that the measurement-based value of $V_\pi.L$ for the single waveguide CPW modulator is substantially less than the value calculated for the single-waveguide slotline device having the same gap width and the corresponding waveguide position. Therefore, the assumption that the field in one gap of a CPW transmission line having a given gap is the same as the field in a slotline of the same gap is not valid. It follows that one cannot predict $V_\pi.L$ for a modulator having a CPW transmission line on the basis of Marcuse's work.

More recently, C. M. Kim and R. V. Ramaswamy have reported ("Overlap Integral Factors in Integrated Optic Modulators and Switches", Journal of Lightwave Technology, Vol. 7, No. 7, July 1989, 1063–1070) that, even for finite electrode widths, optimum design places each waveguide near the middle of a small electrode gap, for X-cut $LiNbO_3$. In the Z-cut $LiNbO_3$ case, K. Kawano, et al report ("New Travelling-wave Electrode Mach-Zehnder Optical Modulator with 20 GHz Bandwidth and 4.7V Driving Voltage at 1.52 μm Wavelength", Electronic Letters, Vol. 25, No 20, 1382–1383) enhancement in modulation efficiency with small CPW center electrode width, and the electrode gaps sufficiently wide to produce a 50 ohm transmission line impedance.

However, to the knowledge of the applicants, no one has heretofore recognized the system advantages in placing optical waveguides near a narrow center electrode in a coplanar transmission line structure having gaps wide enough to obtain impedance matching with external (typically 50 ohm) transmission lines, for the case of X-cut, Y-propagating $LiNbO_3$, or any other integrated optical geometry or material system which uses the electro-optic interaction between the guided optical fields and the applied electric field components parallel to the plane of the electrodes.

SUMMARY OF THE INVENTION

The applicants believe that the failure of other workers to completely explore wide-gap coplanar traveling-wave electrodes for optical guided-wave modulators and switches is due to the realization that wide gaps, required for typically useful (e.g., 50 ohm) impedances on material having a high relative dielectric constant, such as $LiNbO_3$, must result in a decreased electro-optic interaction strength. However, the applicants have discovered that "field-bunching" near a narrow electrode can result in significant enhancement in electro-optic interaction between applied field components parallel to the integrated optic device surface and optical fields confined to a waveguide located near an edge of the narrow electrode, even in the case of electrode gaps much wider than the optical waveguide.

This field bunching allows electro-optic modulators to be realized with both high characteristic impedance (e.g. 50 ohm) and improved electro-optic interaction by placing the optical waveguides near the edges of the coplanar waveguide electrodes and the narrower these electrodes the greater the improvement in electro-optic interaction.

In accordance with the present invention, an electro-optic device comprises a substrate of electro-optic material having at least one optical waveguide formed therein subjacent a main surface thereof for propagating an optical mode and a coplanar transmission line formed on the main surface of the substrate and having at least first and second electrodes spaced apart by an electrode gap that is wider than the first electrode. The center of the waveguide is within the electrode gap and closer to the first electrode than to the second electrode.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

It has previously been explained that Marcuse's theory, which was developed for slotline, does not accurately predict the value of $V_\pi.L$ in the case of a CPW transmission line having a wide gap.

Figure 2:
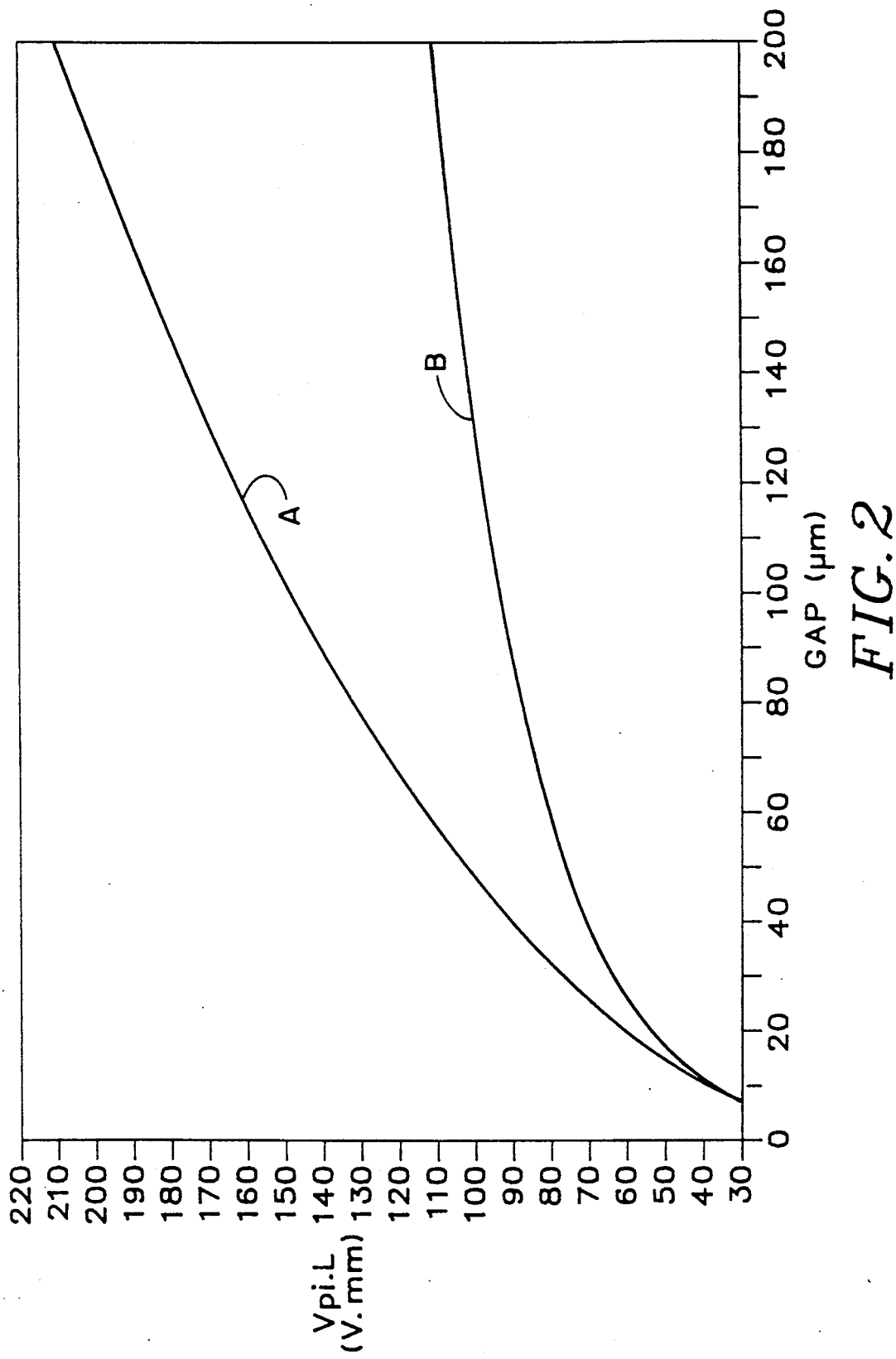
FIG. 2 is a graph in which curve A illustrates $V_\pi.L$ function of gap width for an electro-optic modulator having a slotline transmission line and a single waveguide offset by 3.0 μm from the edge of one electrode, the data point (x) indicating a measurement-based value of $V_\pi.L$ for an electro-optic modulator having a CPW transmission line and a single waveguide offset by 3.0 μm from the edge of the 30 μm center electrode, and curve B illustrates $V_\pi.L$ as a function of gap width for an electro-optic modulator having a CPW transmission line and a single waveguide offset by 3.0 μm from the edge of the 30 μm electrode, assuming an optical mode with a 1/e intensity full width of 3.2 μm and centered 1.4 μm below the surface of the crystal.

A model for the CPW transmission line modulator can be obtained by using fields derived from the conformal mapping described in C. P. Wen, "Coplanar Waveguide: A Surface Strip Transmission Line Suitable for Non-reciprocal Gyromagnetic Device Applications", *IEEE Trans. on Microwave Theory and Techniques*, Vol. MTT-17, 12, 1087—1090 (1969). Curve B in FIG. 2 represents $V_\pi.L$ as a function of electrode gap calculated on the basis of this model for a modulator having a CPW transmission line with 30 μm center electrode on an X-cut, Y propagating crystal of LiNbO$_3$, with the single waveguide having its center offset from the center electrode by 3.0 μm. The correspondence between the calculated value for a gap width of 134 μm and the measurement-based value for that gap width (the cross in FIG. 2) is remarkable.

In the case of a push-pull device with two symmetrically placed waveguides, the value of $V_\pi.L$ would be half the value shown by curve B for any given gap.

Figure 1A:
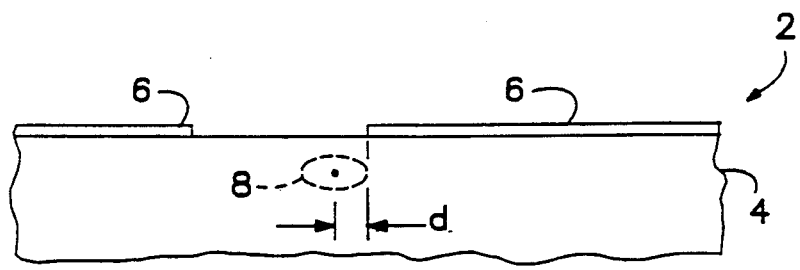
FIG. 1A is a sectional view of an electro-optic having a single waveguide and a single waveguide and a slotline transmission line.
Figure 1B:
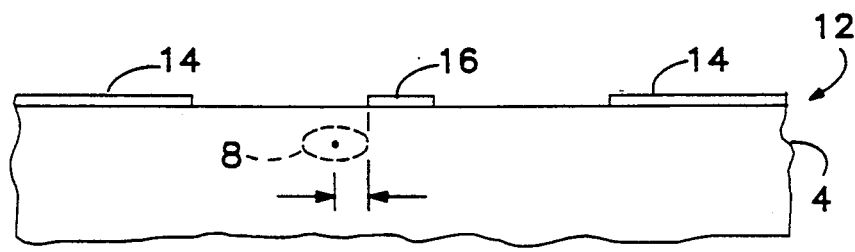
FIG. 1B is a sectional view of an electro-optic modulator having a single waveguide and a CPW transmission line.
Figure 3:
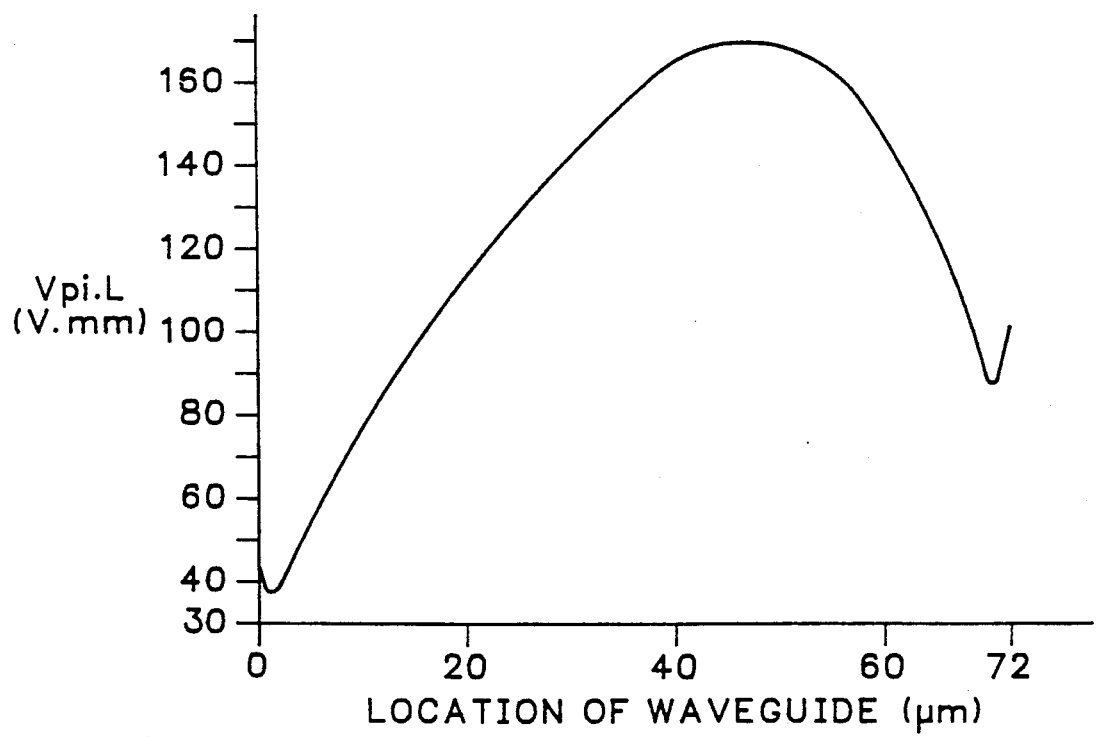
FIG. 3 is a graph illustrating $V_\pi.L$ for a push-pull electro-optic modulator with center electrode width of 30 μm as a function of position of two waveguide branches that are placed symmetrically about the center electrode, each in a 72 μm gap at a wavelength of 830 μm, assuming an optical mode with a 1/e intensity full width of 3.2 μm and centered 1.4 μm below the surface of the crystal.

Using the same model for the CPW transmission line, the dependence of $V_\pi.L$ on waveguide placement within the gap can be calculated. FIG. 3 shows the calculated variation of $V_\pi.L$ as a function of waveguide to electrode separation for the specific case in which S=30 μm, W=72 μm, d (the depth of the center of the waveguide)=1.4 μm and w (the optical 1/e intensity full width)=3.2 μm. FIG. 3 shows that $V_\pi.L$ is near its maximum at the center of the gap and is very much smaller than the maximum (about one-third or less) close to the center electrode. Minima for $V_\pi.L$ are about 1.5 μm from the electrodes, and the minimum near the center electrode is less than half that near one of the outer electrodes. For an offset of 3.0 μm, for which the guided optical mode does not extend beneath the electrode to a significant extent and therefore optical losses are reasonably low, $V_\pi.L$ is only about 10% more than its minimum value.

The significant difference between the value of $V_\pi.L$ for a wide gap, both measured and calculated in accordance with the applicants' theory, and the value based on Marcuse's slotline theory, can be attributed to the field bunching adjacent the relatively narrow center electrode of the CPW transmission line. For a large value of W and a small value of S, the field enhancement adjacent the narrow center electrode is pronounced, and consequently $V_\pi.L$ is sufficiently small to allow fabrication of a relatively efficient push-pull electro-optic modulator having a high bandwidth and employing a 50 ohm CPW transmission line on a substrate of LiNbO$_3$.

Figure 4:
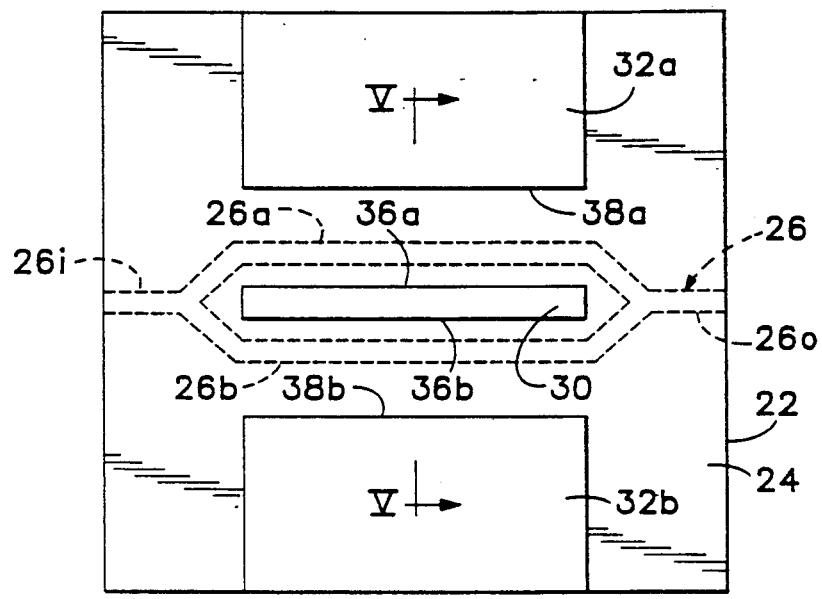
FIG. 4 is a schematic top plan view of a traveling wave push-pull electro-optic modulator having a CPW transmission line and with one waveguide in each gap.
Figure 5:
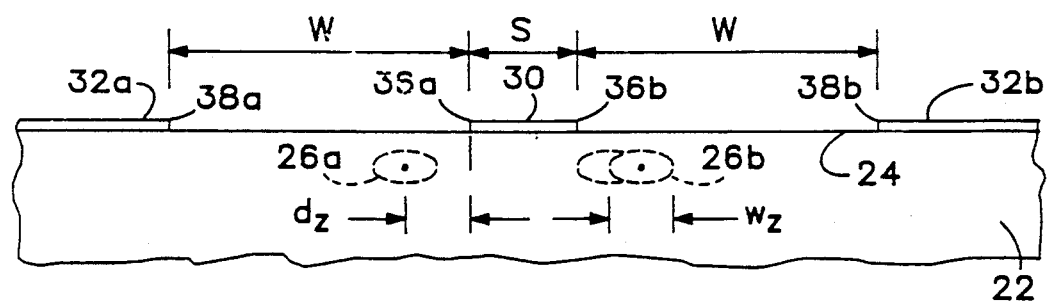
FIG. 5 is an enlarged sectional view on the line V—V of FIG. 4

The modulator illustrated in FIGS. 4 and 5 comprises a substrate 22 of LiNbO$_3$ having a top surface 24 and an optical waveguide 26 formed subjacent surface 24. The waveguide has an input section 26i and an output section 26o, and between the input and output sections is divided into two branches 26a and 26b. Metal is deposited on surface 24 of substrate 22 and is patterned to define three distinct electrodes 30, 32a and 32b. Center electrode 30 is elongated and has two opposite longitudinal edges 36a and 36b. The width S of center electrode 30 is substantially less than the width W of the gap between center electrode 30 and each outer electrode. Outer electrodes 32a and 32b have edges 38a and 38b respectively, and each is of substantially greater width, perpendicular to its edge 38, than the gaps between electrode 30 and electrodes 32a, 32b. The distance between edges 36b and 38b is substantially equal to the distance between edges 36a and 38a.

Substrate 22 is, for example, X-cut, Y-propagating. Surface 24 therefore lies in the Z-Y plane, with the Y axis parallel to edges 36, 38 of electrodes 30, 32. Consequently, the field component $E_z$ is parallel to surface 24 and perpendicular to the direction of propagation of light through waveguide branches 26a and 26b.

Waveguide branches 26a and 26b are positioned in the substrate such that the spacing $d_z$ in the direction parallel to the surface 24 between the centers of the waveguide branches and adjacent edges 36a, 36b of center electrode 30 is less than half the width W of the gap between electrode 30 and each of the outer electrodes 32.

It will be seen that the optical 1/e intensity full width $w_z$ of the mode propagated by waveguide branches 26a, 26b is substantially less than W.

The present invention allows a 50 ohm modulator to be designed utilizing fields parallel to the device surface and such that the required drive voltages are much closer to those employed in the low impedance modulators than was previously recognized to be possible. The benefits of lower distortion and mismatch inherent in using the 50 ohm modulator in a 50 ohm system are realized while maintaining relatively low drive voltage and power requirements.

It will be appreciated that the invention is not restricted to the particular embodiment that has been described, and that variations may be made therein without departing from the scope of the invention as defined in the appended claims and equivalents thereof. For example, in the case of an electro-optic modulator having a CPW transmission line, the invention is not limited to the waveguide branches being positioned closer to the center electrode than to the outer electrodes, since the outer electrodes may be narrower than the gap and field bunching would then occur close to the outer electrodes also. Even in the case of a CPW transmission line with outer electrodes that are wider than the gap, factors other than the desire to maximize sensitivity may make it desirable to place the waveguide branches closer to the outer electrodes than to the center electrode. The invention is not restricted to use with LiNbO$_3$ or to the transmission line having a 50 ohm characteristic impedance, but may be applied to other materials such as LiTaO$_3$, that exhibit the electro-optic effect and have a dielectric constant such that, for the desired characteristic impedance, the minimum width of the electrode gap is greater than the width of the center electrode. Edges 36a, 36b, 38a and 38b are shown straight and parallel in FIG. 4 by way of example, not limitation. The invention is not limited in its application to CPW transmission lines, but is applicable to other configurations of coplanar waveguides, such as the asymmetric coplanar strip, provided the gap is wider than at least one electrode.

We claim:

1. An electro-optic device comprising:
a substrate of electro-optic material having at least one optical waveguide formed therein adjacent a main surface thereof for propagating an optical mode, and
a coplanar transmission line formed on the main surface of the substrate and having at least first and second electrodes spaced apart by an electrode gap that is wider than the first electrode, the first electrode being narrower than the second electrode, and the center of the waveguide being within the electrode gap and closer to the first electrode than the second electrode.

2. An electro-optic device according to claim 1, wherein the width of the mode propagated by the waveguide is less than the width of the electrode gap.

3. An electro-optic device according to claim 3, wherein the width of the mode propagated by the waveguide is much less than the width of the gap.

4. An electro-optic device according to claim 1, wherein a second waveguide is formed in the substrate subjacent the main surface thereof.

5. An electro-optic device according to claim 1, wherein the center of the waveguide is spaced from the first electrode by a distance that is much less than the distance between the first electrode and the second electrode.

6. An electro-optic device according to claim 1, wherein the coplanar transmission line has a third electrode and the first electrode is between the third electrode and the second electrode and is spaced from the third electrode by a second electrode gap.

7. An electro-optic device according to claim 6, wherein a second waveguide is formed in the substrate subjacent the main surface thereof, the center of the second waveguide being within the second electrode gap.

8. An electro-optic device according to claim 7, wherein the center of the second waveguide is closer to the first electrode than the third electrode.

9. An electro-optic device according to claim 7, wherein the center of the second waveguide is spaced from the first electrode by a distance that is much less than the width of the second electrode gap.

* * * * *